(12) United States Patent
Johansson et al.

(10) Patent No.: US 8,737,223 B2
(45) Date of Patent: May 27, 2014

(54) MONITORING OF DELAY IN PACKET-SWITCHED NETWORKS

(75) Inventors: Ingemar Johansson, Luleå (SE); Tomas Frankkila, Luleå (SE); Stefan Håkansson, Luleå (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 99 days.

(21) Appl. No.: 13/375,620

(22) PCT Filed: Jun. 12, 2009

(86) PCT No.: PCT/EP2009/004257
§ 371 (c)(1),
(2), (4) Date: Dec. 1, 2011

(87) PCT Pub. No.: WO2010/142312
PCT Pub. Date: Dec. 16, 2010

(65) Prior Publication Data
US 2012/0120813 A1    May 17, 2012

(51) Int. Cl.
*H04L 12/26* (2006.01)
(52) U.S. Cl.
USPC .......................................... 370/235
(58) Field of Classification Search
USPC .......................... 370/236, 249, 252
See application file for complete search history.

(56) References Cited

U.S. PATENT DOCUMENTS

| | | | |
|---|---|---|---|
| 7,496,040 B2* | 2/2009 | Seo ............................ | 370/238 |
| 7,539,148 B2* | 5/2009 | Scholtens et al. ............ | 370/248 |
| 7,969,900 B2* | 6/2011 | Abdo et al. .................. | 370/252 |
| 8,345,659 B2* | 1/2013 | Chen et al. ................... | 370/350 |
| 2006/0056429 A1 | 3/2006 | Usukura | |

FOREIGN PATENT DOCUMENTS

| | | |
|---|---|---|
| EP | 1619816 A2 | 1/2006 |
| EP | 1619840 A1 | 1/2006 |
| JP | 2006086668 A | 3/2006 |
| WO | 2008086509 A2 | 7/2008 |

OTHER PUBLICATIONS

Sfairopoulou, A. et al. "Dynamic measurement-based codec selection for VoIP in multirate IEEE 802.11 WLANs", The 8th COST 290 Management Committee Meeting, Feb. 15-17, 2007, pp. 1-20, Universidad de Málaga, Spain.

* cited by examiner

*Primary Examiner* — Anh-Vu Ly
*Assistant Examiner* — Abdullahi Ahmed
(74) *Attorney, Agent, or Firm* — Coats and Bennett PLLC

(57) ABSTRACT

A method is proposed for determining the round-trip delay for sending multimedia data, such as voice or video data, between a first network node and a second network node over a communications network, where data is encapsulated in data units comprising at least one frame of encoded data. The method includes the steps of: said first network node sending a request for reconfiguration of the data unit structure to the second node; the first node detecting a reconfiguration response from the second node, where the reconfiguration response comprises at least one data unit of data having a structure that corresponds to the request for reconfiguration. The first node then measures the time elapsed between sending the reconfiguration request and detecting the reconfiguration response and determines a value for roundtrip delay using said measured time. In accordance with a first embodiment, the request for reconfiguration is a request to change the encoding mode of the multimedia data. A node adapted to measure this round-trip delay is also proposed.

24 Claims, 3 Drawing Sheets

MONITORING OF DELAY IN PACKET-SWITCHED NETWORKS

TECHNICAL FIELD

The present invention relates to the monitoring of transmission delay of multimedia traffic, such as voice or video traffic, over a packet-switched network. It has particular relevance to voice over Internet Protocol applications.

BACKGROUND

The use of packet-switched networks to transport multimedia traffic, such as telephony, Internet TV, and video services is becoming more widespread. However, it is well known that these services are highly sensitive to delay. In the case of voice calls an excessive round-trip delay is disconcerting to the user and results in the degradation in conversational quality. In this document, the round-trip delay is intended to define the total time for data, speech or other multimedia traffic to be sent from a first user over a transmission medium to a second user and for the response to be sent from the second user back to the first user. The extent to which a user perceives a delay as disturbing depends on a number of different factors, including the language used, the mood of the parties and the type of conversation. In an attempt to find a common standard, the International Telecommunication Union (ITU) has proposed a one-way (mouth-to-ear) delay threshold in ITU-T G.114 of 150 ms, above which delay is considered to impinge on quality.

For packet-switched networks and services, and especially for IP networks, the delay will depend on a large number of factors which cause a lesser or greater delay variation at different times and locations. Among these factors are the network topology and the components used, which may vary greatly from one IP end-to-end voice call to another, usually without the end points having knowledge of the networks concerned. Network load is also a significant factor affecting the delay and also the delay jitter. A high network load results in long queues in routers and hence in increased delay. IP networks transmitted over wireless links are also sensitive to radio conditions, which affect the transmission time resulting in a longer overall delay when conditions are bad. A further factor is the time required for packetization. If longer speech frames are used or the number of speech frames included per packet increases delay will also increase.

While the transmission delay in packet-switched networks will differ for different paths, it is nevertheless an advantage to know the delay for a specific link, particularly for VoIP services. This advantage lies in the possibility to adapt the client node behaviour to the expected delay. For example, the function of a jitter buffer in a receiving node can be modified to accept more late losses when delay is likely to be long in order to minimize additional delay. Late loss is a term given to packets that are discarded at a receiver if they arrive after a certain delay. Conversely, when the network delay is short, the jitter buffer can buffer frames for a longer length of time to reduce the late losses.

A difficulty in monitoring delays over a network, particularly in radio access networks supporting packet-switched multimedia traffic, is that traffic will typically be classed in queues according to priority, with each queue being shared by several users or even by different traffic types, i.e. voice, data, video for the same user. Such networks are ideally unaware of the services they are carrying. The consequence is that monitoring the performance of individual streams is very problematic on a network level.

In a circuit-switched system, delay is a system design parameter. Moreover, delay does not vary in the network as it is set up for voice calls. In the Global System for Mobile Communication, GSM, the mouth-to-ear delay is designed to be around 200 ms. For Wideband Code Division Multiple Access, WCDMA, mouth-to-ear delay is designed to be around 225 ms. However, depending on the number of networks included in any specific link between two end nodes, there are still occasions when the real delay is very different from these standards. In such cases the knowledge of the real delay can be useful.

SUMMARY

It is an object of the present invention to provide a method and arrangement for ascertaining at least an estimate of the round-trip delay of multimedia traffic streams over either a packet-switched or circuit switched network.

This and further objects are achieved in accordance with the present invention in a method for determining the round-trip delay for sending multimedia data, such as voice or video data between a first network node and a second network node over a communications network, wherein data is encapsulated in data units comprising at least one frame of encoded data. This encoded data may either consist of coded multimedia data, such as speech or video data, or alternatively be data that represents the absence of multimedia data, for example, silence, when no multimedia data is available for transmission. In the method, the first network node sends a request for reconfiguration of the data unit structure to the second node and receives a reconfiguration response from the second node. The reconfiguration response comprises at least one data unit, wherein the data unit has a structure that corresponds to said request for reconfiguration. The first node then measures the time elapsed between sending the reconfiguration request and receiving the reconfiguration response and determining a value for round-trip delay using this measured time.

According to a further aspect of the invention, the above object is achieved in a node of a communications system for receiving multimedia traffic from and transmitting multimedia traffic to at least a second node over the communications network. The node is adapted to encode data into data units prior to transmission over said network to the at least one second node and to decode encoded data comprised in data units received from the second node over said communications network. The data units comprise at least one frame of encoded data. The node comprises a controller adapted to control the generation and reception of the data units. The controller is further adapted to send a request for reconfiguration of the structure of the data units to the second node and to detect a reconfiguration response to the reconfiguration request from the second node, where the reconfiguration response comprises at least one data unit having a structure that corresponds to the request for reconfiguration. The controller is still further adapted to measure the time elapsed between sending the reconfiguration request and receiving the reconfiguration response and to determine a value for round-trip delay for transmission of data to and from said second node using this measured time.

This method and arrangement enable individual nodes in either a packet-switched or circuit-switched network to perform the measurement of delay over a specific link to a reasonably accurate value and with little or no disruption to the network as a whole. Moreover, since the reconfiguration response is a normal data unit of multimedia data that has been reconfigured to present a different structure, preferably in a conventional way, the terminating node of this specific link requires limited or no modification. The different structure of the at least one data unit after reconfiguration may, for example, be a different overall size or length, a different size or length only of certain elements of the data unit or the presence of different information in a specific field or fields of the data unit. Alternatively, the different structure may relate to more than one received data units, for example when the redundancy or retransmission of frames of encoded data is concerned. The delay information obtainable through this method and arrangement allows the node to modify its operation in a manner to improve the perceived quality, optimise the network resource usage and achieve a maximum efficiency in resource usage in order to increase battery life. While the request for reconfiguration may be sent separately from traffic data units, i.e. on a different logical channel from traffic data, it is preferred in accordance with the present invention that the request is sent in-band, i.e. on the same logical channel as the traffic data, and preferably forms part of the ordinary data units or frames.

In accordance with a first embodiment of the present invention, the reconfiguration request is a request to change an encoding mode used to encode data in the frame or frames. The reconfiguration response is then detected when a data unit received from the second node includes at least one frame of data that is encoded according to the encoding mode indicated in the encoding mode change request. This embodiment is particularly simple to implement as it requires no modification of the normal operation of the second node; this node simply responds to an encoding mode change request, such as a coding mode request (CMR) used in the Adaptive Multi-Rate codec (AMR), in the normal way. This embodiment is applicable to both circuit switched networks, where the data unit is a frame of encoded multimedia data, and to packet-switched networks, wherein each data unit is a packet that encapsulates at least one frame of encoded data.

In accordance with a second embodiment of the present invention each data unit is a packet that encapsulates at least one frame of encoded data. In accordance with this embodiment, the request for reconfiguration of the data unit structure is a request for changing the number of frames of encoded data comprised in a packet, i.e. a request to modify the frame aggregation. Altering the frame aggregation in this manner allows a delay estimation to be made in situations when the coding mode of the traffic data is restricted for any reason or simply not desired over a particular link. Moreover, combining this request with a request for a change in encoding mode provides some flexibility in responding to the request. The originating mode can then determine the delay based on a data unit modified in response to either request.

In accordance with a third embodiment of the present invention wherein each data unit is similarly a packet that encapsulates at least one frame of encoded data, the request for reconfiguration of said data unit structure is a request for changing the number of times at least one frame of encoded data is transmitted in different packets, i.e the redundancy level of a frame. Allowing a request for change in redundancy to initiate a delay measurement provides still more flexibility. In this regard, the number of times at least one encoded frame is retransmitted applies both to the case where all frames of encoded data contained in the packet are retransmitted at least once, i.e. 100% redundancy or more, and to the case where only some of the frames are retransmitted, for example 50% redundancy.

The three embodiments described above may be used either alone or in any combination. For example, a reconfiguration request may relate both to a change in redundancy and to one or both of a change in coding mode and a change in frame aggregation. Other combinations are similarly possible. A reconfiguration response can then be detected when a packet unit is reconfigured according to at least one of the requested changes.

Further embodiments of the invention are set out in the appended claims.

BRIEF DESCRIPTION OF THE DRAWINGS

Further objects and advantages of the present invention will become apparent from the following description of the preferred embodiments that are given by way of example with reference to the accompanying drawings. In the figures.

DETAILED DESCRIPTION

In the following description the invention will be described with reference to an end-to-end link over a packet-switched network carrying voice over Internet Protocol (VoIP) data. However, it should be understood that the principles of the invention are readily applicable to packet-switched network links carrying other multimedia traffic such as audio services, video services and the like. In addition, the invention can also be employed to measure transmission or acoustic delay of encoded speech data between two nodes connected via circuit-switched network. In the latter case, speech data can be transported in units of data or data units consisting of encoded speech frames or in a packet structure, such as an ATM frame. The data units carrying encoded speech over a packet-switched network consist of packets (generally RTP packets), which encapsulate one or more frames of encoded speech data.

Figure 1:
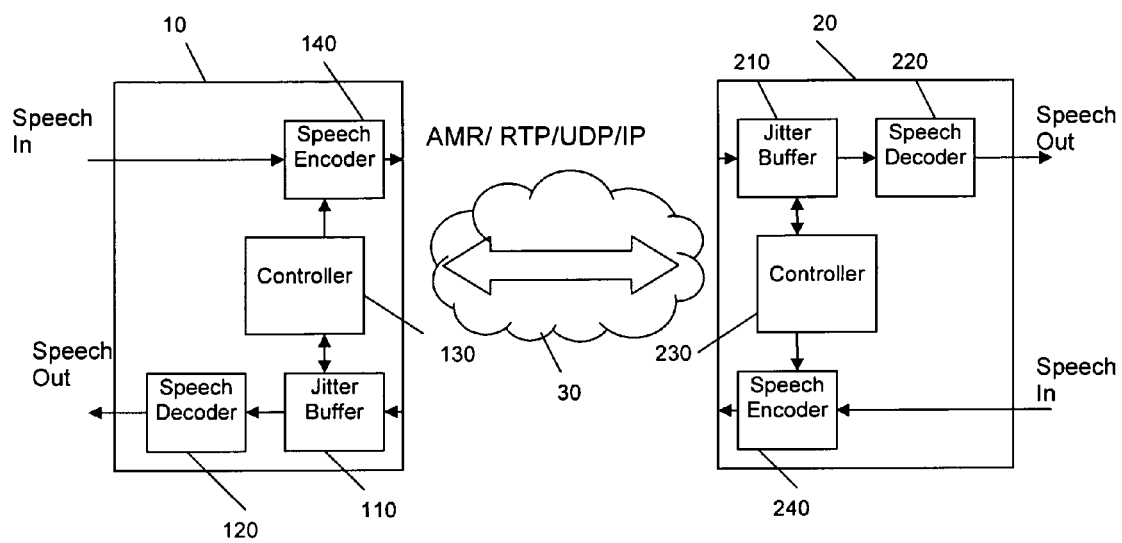
FIG. 1 schematically illustrates two nodes capable of transmitting encoded speech across a packet-switched network, FIG. 2 schematically shows the structure of an AMR payload for an RTP packet.

FIG. 1 shows two end nodes in a packet-switched network which operate according to a first embodiment of the present invention. The nodes represent any nodes capable of transmitting and receiving voice or multimedia traffic over a packet-switched network. For example, a first node 10 may be a mobile station, such as a wireless phone, while the second node 20 is a further terminal, or a multimedia gateway. First and second nodes 10, 20 are connected to a packet-switched network 30 and communicate with one another over this packet-switched network. The packet-switched network 30 is preferably an IP network, and may, for example, be a wired or wireless local area network (WLAN) in a corporate environment or public area such as an airport or station. In the present example, the IP network 30 is shown as a single network arranged between the first and second nodes 10, 20 for reasons of simplicity. However, it will be understood that the network 30 may be made up of many different physical networks employing different access methods, none of which is known by the two nodes 10, 20. Moreover, the path taken by traffic exchanged between the first and second nodes 10, 20 can be made up of multiple links between many other nodes forming part of the network 30.

In accordance with the illustrated example, speech is transmitted over the network 30 using the Real-time Transport protocol (RTP) over the User Datagram Protocol (UDP) over the Internet Protocol (IP). In effect, speech data forms the payload of the RTP packet. In addition, the speech data is encoded with an encoder 140 at the sending end and decoded by a decoder 220 at the receiving end. Such encoders/decoders are referred to as codecs.

The codec employed preferably has multiple modes of operation. Examples of such codecs include the Adaptive Multi-Rate (AMR) speech codec, defined in GSM specification 06.90 which is a multimode codec that can operate in any of eight different modes with bit rates varying from 4.75 to 12.2 kbps. A further multimode codec is the Adaptive Multi-Rate Wideband (AMR-WB) speech codec, which is similar to AMR and supports nine wide band speech coding modes with bit rates ranging from 6.6 to 23.85 kbps. Although originally designed for circuit-switched mobile radio systems, they are also suitable for other real-time speech communication services over packet-switched networks. A Real-time Transport (RTP) payload format for the AMR and AMR-WB codecs which enables the use of AMR and AMR-WB over IP networks is specified in IETF RFC 4867, A further example of a multimode speech codec is the G.729.1 audio codec, which is described in ITU-T Recommendation G.729.1. A Real-time Transport (RTP) payload format for the G.729 codec is described in IETF RFC 4749.

As illustrated in FIG. 1, the nodes 10, 20 include a number of elements, which will be described in more detail below. The nodes 10, 20 will naturally include additional elements that are not illustrated, but are well known to one of ordinary skill in the art. However, as these additional elements are not of particular relevance to the present however, they will not be described here.

As shown in FIG. 1, each node 10, 20 includes a jitter buffer 110, 210 to minimize packet delay variations in the incoming RTP packets. Preferably, the jitter buffer 110, 210 is adaptive, in other words, it is capable of modifying the buffering delay in accordance with changing network jitter characteristics. The jitter buffer 110, 210 may store complete RTP packets as they are received. Preferably, however, the RTP packets are first unpacked and only the frames of encoded speech data contained in the RTP payload are stored in the jitter buffer 110, 120 in the correct order relative to the other frames currently in the buffer by the buffer algorithm in the controller 130, 230. Frames that arrive too late are discarded. The ordering of the packets or frames can be determined by using packet sequence numbers or packet or frame timestamps. The frames are released by the jitter buffer 110, 210 to a speech decoder 120, 220, which outputs decoded speech. The controller 130, 230 also reads control information contained in the RTP packets, i.e. in-band control information received over the packet-switched network 30.

In accordance with the present invention, one node, which in the present examples is the first node 10, is capable of determining the round trip delay over a link to another node. In the present example, this is the delay between sending data from the first node 10 to the second node 20 and receiving the response from this second node 20 at the first node 10. This is achieved by the first node 10 sending a request for reconfiguration of data units carrying speech data to the second node 20. Upon receipt of this request, the second node 20 should respond by modifying the configuration of data units that are sent to the first node 10 to correspond to the request. Once the first node 10 detects the reconfigured data units, it can determine the time elapsed between sending the request and detecting the modified data units. This value can then be used to determine or estimate the transmission delay or the acoustic delay between the two nodes. The transmission delay is the time between a first node sending a data unit and the second node receiving this data unit, i.e. before the speech frames are put into the jitter buffer 210. The acoustic delay is the delay for receiving speech and hence includes the jitter buffer delay and the time required to decode the encoded data.

Preferably, the reconfiguration request relates to a parameter that is modified during the normal operation of the link between the two nodes. In this way, the operation of the second node 20 does not need to be altered. The request may be sent as control data separately from a data unit carrying speech data. Preferably, however, the request is sent in-band as control data embedded in the data unit carrying the speech data.

In accordance with a first embodiment of the present invention, the reconfiguration request is a request to change the encoding and decoding mode (i.e. the codec mode) of the codec used to encode the speech data.

Figure 2:
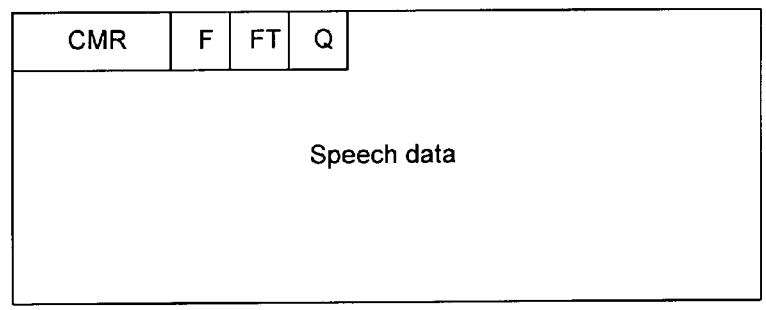

In multi-mode codecs of the types described above, a change in the codec mode can be requested by sending a mode request. This request can be sent in-band as part of the RTP payload containing encoded speech data. In AMR codecs, for example, the mode request is called a codec mode request or CMR and is provided as part of the header that makes up an RTP packet payload. The structure of an RTP payload for the AMR audio codec, hereinafter referred to as the AMR payload, is shown schematically in FIG. 2. The structure is essentially divided into three parts. A first portion, forming the AMR payload header is a 4-bit Codec mode request CMR field. A second portion, the so-called table of contents (ToC), which may also be considered as part of the header, is a list of entries for each speech frame included in the AMR payload, i.e. in a single RTP packet. The ToC illustrated in FIG. 2 has entries for one speech frame only. This consists of a 1-bit flag (F) indicating whether more frames follows the current frame or not; a 4-bit Frame Type (FT) field indicating the codec mode used for the encoding of the speech frame including the comfort noise mode; and a 1-bit frame quality indicator (Q) flag. Finally, the third portion of the AMR payload contains the encoded speech data in frames. If more than one speech frame is included in the RTP payload, the ToC contains consecutive lists of entries for each speech frame and the ToC is followed by the speech frames.

It will be understood, that this principle is applicable to other codes such as the G.729.1 codec and other systems. For example in W-CDMA a similar request would be an Iu/Nb rate control message. For video and other multimedia, a request for changing the encoded format will take another form. It is further possible to send a request out-of-band, for example by using an RTP control protocol (RTCP) message.

Figure 3:
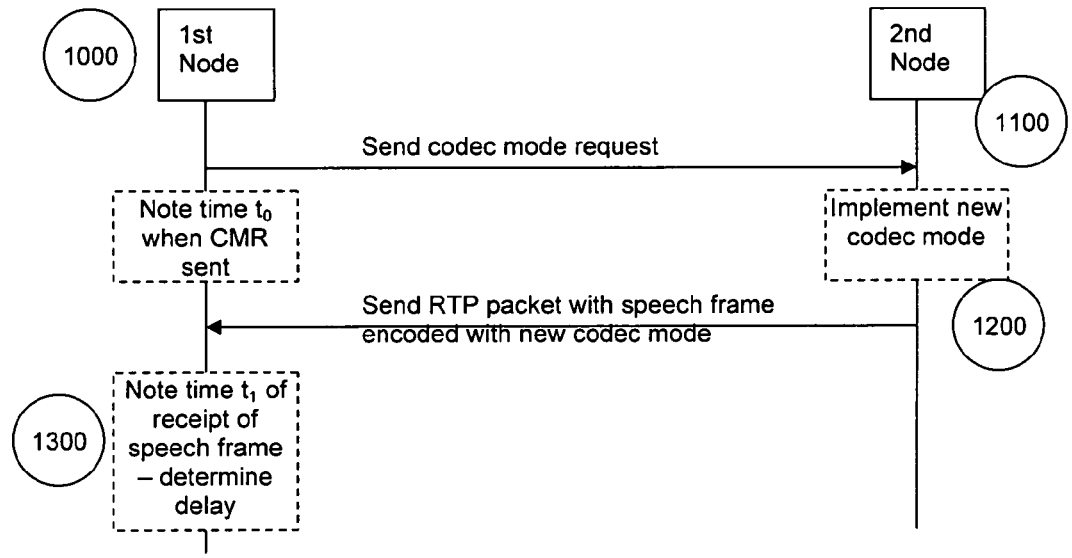
FIG. 3 illustrates the signalling between the nodes for determining a round trip delay in accordance with a first embodiment of the present invention.

In essence, the mechanism for determining the round trip delay is the following. The first node 10 sends a request to modify the codec mode. Upon receipt of this request, the second node 20 responds request by changing the codec mode used to encode speech in subsequent packets. Upon receiving speech data encoded using the new codec mode, the first node 10 can then determine the delay between sending the codec mode change request and receiving the response. This is an estimate of the round-trip delay between the nodes. FIG. 3 schematically illustrates the signalling and other steps involved in this process. At event 1000 the first node 10 requests a codec mode or rate change by sending a codec mode request (CMR) in-band in the RTP packet addressed to the second node (20). The controller 130 in this first node 10 notes the time $t_0$ at which the frame incorporating the CMR is sent. In the second node 20, the CMR is identified by controller 230 at 1100, and controls the speech encoder 240 to change the codec mode used in the next speech frame in accordance with the CMR received. At event 1200, a packet is transmitted from the second node 20 to the first node 10 containing speech data encoded according to the new mode. This is identified by the frame type indicator contained in the AMR header illustrated in FIG. 2. The first node 10, upon receipt of the frame containing speech encoded with the new mode and detecting this change of mode in the frame type field, determines the time $t_1$ of receipt and the delay $(t_1-t_0)$ between sending the CMR and receipt of this frame at event 1300. This is then the round-trip delay. Alternatively, the first node 10 could start a timer when the CMR is sent and stop this upon receipt of the frame at event 1300.

Obviously, the delay measurement will be a more accurate reflection of the real delay if the round-trip delay is measured several times within a relatively short space of time and the lowest value taken as any variation in delay is likely to be due to jitter.

The first node 10 starts measuring the time when the data leaves the speech encoder 140. Any coding delay is thus not counted. However, the measured time will include the transmission delay from the first node 10 to the second node 20 and from the second node to the first node 10, including jitter, as well as delays imposed by the speech encoder 240 of the second node 20 and possibly also by the jitter buffer 210 of the second node 20, the speech decoder 220 of the second node, the jitter buffer 110 of the first node 10 and speech decoder 120 of the first node. The delays caused by the encoder 140 and decoders 220, 120 can be estimated as fixed values. The delay caused by the jitter buffers 210, 110 can also be estimated, but as a dynamic value. However, the precision of the delay determination will depend on how the second node 20 handles the CMR. For example, if the second node extracts the CMR at the same time as the speech data is read out from the jitter buffer, the delay calculation will provide a more accurate reflection of acoustic delay, i.e. the delay imposed on the speech and perceived by a user. Preferably, the second node should respond immediately to the CMR and extract the CMR before the speech data is buffered in the jitter buffer, as this means that the fixed and dynamic parts can be estimated separately, resulting in a more accurate value. Similar considerations apply when the request is not part of a packet or data unit, but is instead sent out-of-band as a control message.

A further factor influencing the accuracy of the measurements is whether one of the links is using discontinuous transmission (DTX). Discontinuous transmission is a method whereby the transmitter stops sending coded speech frames when there is no voice input. The speech coder includes a Voice Activity Detection (VAD) algorithm, to determine if an audio frame contains silence or actual audio. During silence periods, the coder may significantly decrease the transmitted bit rate by sending a small frame called a Silence Insertion Descriptor (SID), and then stop transmission. The coder may also send SID frames more rarely than normal speech frames. In AMR, speech frames are sent every 20 ms while SID frames are sent every 160 ms. The receiver's decoder will generate comfort noise (CNG) according to the parameters contained in the SID. This is used to conserve battery power and ease workload on components in the transmitter amplifiers in mobile devices, but also to reduce interference and increase capacity. If a link is using DTX, the delay measurement described above will be non-representative of the link delay. To overcome this, a number of possibilities exist. A first possibility is simply to compensate for the additional delay when a SID frame is transmitted rather than a speech frame. The receiving node 10 recognises when a received packet contains a SID frame rather than an encoded speech frame, and thus knows the transmission interval used by the sending node 20. The first node 10 can thus compensate for this additional interval when determining the delay from the measured value. In a further example, the outgoing stream could be forced into speech mode while the controller 130 approves measurements only when the incoming stream is not in DTX. The SID frame is easily recognisable by the receiver's decoder, so DTX can be readily identified by the controller 130. In a still further solution, DTX is permitted, but the CMR is sent several times and the controller 130 observes the minimum and maximum measured delays. Other metrics of the delay, such as the average, median or some percentile, such as 75% or 90% are also conceivable. A delay that is clearly different from other measurements can then be discarded. In accordance with a still further method, the measurement is performed when the outgoing stream is in DTX. In other words, the first node sends a SID frame, which has the same packet structure as speech frames and hence will incorporate the CMR in the packet payload. In order to ensure that the receiving node 20 responds immediately, it is possible to force the encoder 240 of this node into speech mode, at least temporarily. This could be done by the decoder 220 or controller 230, forcing a VAD flag in the encoder 240 to '1' (and hence forcing speech encoding mode) upon detecting the CMR in a received packet. This could be maintained for a fixed time or a fixed number of packets after which the override is suppressed and the receiving node 20 responds in the normal way to speech encoded data or a SID. Alternatively, for those codecs wherein the SID frame contains an additional frame type field in the payload, as is the case for AMR, the encoder 240 of the second node could be forced into transmission of an extra SID frame. In this fashion it is possible to indicate a change in codec mode even during discontinuous transmission (DTX).

In accordance with a second and third embodiment of the present invention, the reconfiguration request relates to the structure of the packet carrying speech data. This may take two forms; firstly a change in frame aggregation, that is, the number of non-redundant speech frames that are sent in each RTP packet, and secondly the redundancy in an RTP packet, i.e. how many times a frame is retransmitted in different RTP packets. Once again a request may be sent out-of-band as a control message, for example using RTCP. Alternatively, the request is sent in-band as part of a packet containing speech frames.

Figure 5:
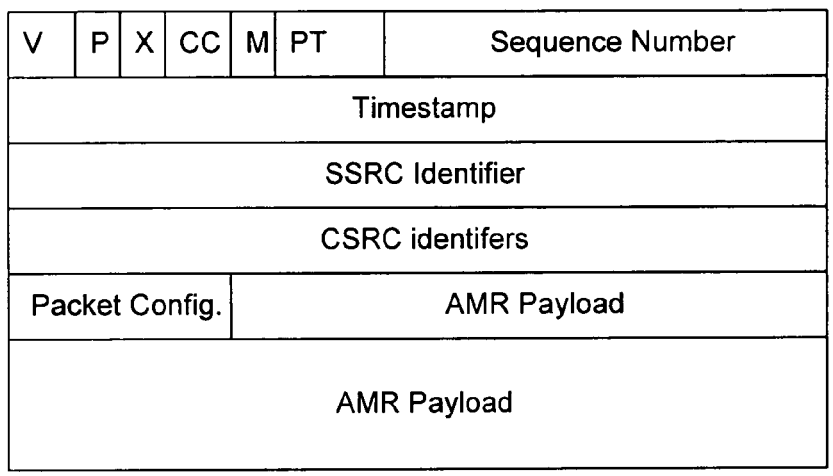
FIG. 5 illustrates the structure of an RTP packet carrying encoded speech and in-band signalling for determining transmission delay in accordance with a third and fourth embodiment of the present invention.

The structure of an RTP packet including packet structure control data is illustrated in FIG. 5. The RTP packet consist of a conventional header portion, a payload portion containing encoded speech data, denoted AMR payload in the illustrated example and, in accordance with the present invention a packet configuration field (Packet Config.), inserted between the conventional header and the payload containing data relating to the configuration of the packet. The structure of the RTP header is well known to those skilled in the art and consists of a first field V denoting the version of the protocol, a field P used to indicate whether there are padding bits at the end of the RTP packet, a field X used to indicate whether an extension header is present, a field CC, which contains the number of contributing source identifiers that follow the fixed header, a field M used at the application level, a PT field which indicates the format of the payload, a sequence number, a timestamp, a synchronization source identifier SSCR, which identifies the source of a stream, a contributing source identifier field CSRC enumerating contributing sources to a stream, if present. The additional field, denoted Packet Config., contains data for requesting and identifying two distinct packet structures. Preferably a first portion of the Packet Config. field contains the identification of this field, while a second portion indicates the specific configuration.

In accordance with a second embodiment of the invention, this field contains data indicating or requesting a specific frame aggregation, i.e. the number of speech frames per packet. Preferably, the second portion of the packet configuration field used to denote the specific configuration identifies from 1 frame per packet with a value 0000 up to 15 frames per packet with a value of 1111. Alternatively, the packet configuration field may contain control data that simply represents a request for an increase or a decrease in frame aggregation. This allows the second node 20 more flexibility in responding, if restraints on the total number of frames exists, for example.

In accordance with a third embodiment of the invention, the Packet Config. field includes data indicating the redundancy level for a packet, and possibly also the offset redundancy. This is the number of times a speech frame is retransmitted in subsequent packets. In one possible arrangement, the second portion of the packet configuration field, which indicates the specific configuration, preferably consists of a series of bits, which, if set to "1" indicate that speech frames of a particular "age" should be transmitted as part of an RTP payload. For example the first bit represents frames that are 20 ms old. Since in AMR, speech frames are sent every 20 ms, this first bit refers to the previous frame. If this bit is set, this indicates that the previous frame is to be retransmitted. The subsequent bits represent frames of ages 40 ms, 60 ms, 80 ms, and so on. Hence a 12-bit field having the value "0,0,0,0,0,1, 0,0,0,1,0,1" indicates that only frames that are 20 ms, 60 ms and 140 ms should be included in the RTP payload. This structure enables the indication of both redundancy level and offset in one field. However, other field structures suited to different codecs would be readily envisaged by those skilled in the art. For example, the second packet configuration field could be divided into two parts for separately indicating redundancy level and offset. The first part could contain a first indicator denoting no redundancy with a value of 00 through to a redundancy level of 300% with a value of 11, incrementing by 100% at a time. The second part could contain a second indicator for offset redundancy, with, for example, 00 indicating redundant data in the next packet, 01, redundant data two packets later, 10 indicating redundant data three packets later up to 11 which indicates redundant data four packets later.

The detection of a reconfiguration response by the first node 10 differs for the second and third embodiments. More specifically, if the second node has responded to a request for change of the frame aggregation, this change is preferably detected in the first node by determining the number of lists of entries in the table of contents field in the RTP header as illustrated in FIG. 5. As each encoded speech frame has an associated table of contents entry, this is the simplest method of determining the frame aggregation. It is also possible to determine the number of frames based on the overall packet length, however, this can vary depending on the codec mode used.

When the configuration request relates to the change in redundancy in accordance with the third embodiment, the first node 10 can establish that this request has been complied with only by determining how many times frames transmitted in a first packet are subsequently retransmitted. This is achieved by the controller 130 in the first node 10 determining the time stamp for received frames and comparing the time stamps to determine whether a frame has been transmitted before. The receipt of the first transmission of a frame triggers the end of the measurement period, although this is only confirmed when the correct redundancy level for this frame has been ascertained.

A further possibility for both the second and third embodiments is to impose the use of a packet configuration field in packets transmitted over the link that can be used to include information indicating either the current frame aggregation or redundancy, or both. In this way, the first node 10 can identify the current packet structure from this information without having to investigate the packet or subsequent packets further.

Figure 4:
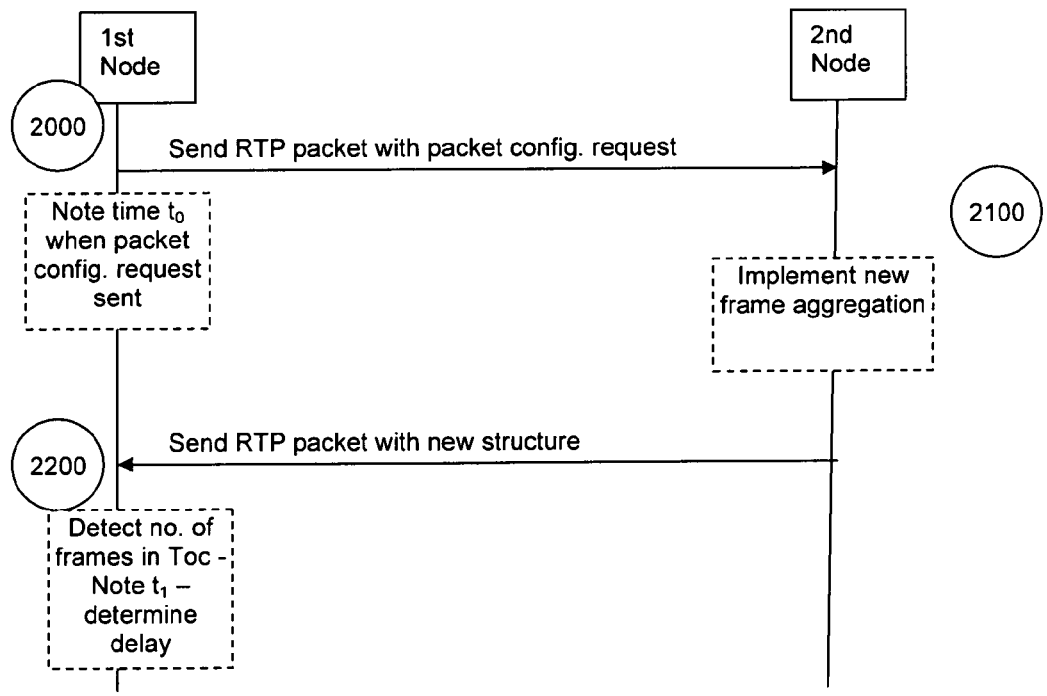
FIG. 4 shows the signalling between the nodes for determining a round trip delay in accordance with a second embodiment of the present invention.

FIG. 4 schematically illustrates the signalling and other steps involved in the measurement of delay using the Packet Config. field in a packet in accordance with the second embodiment of the present invention. At step 2000, the first node sends an RTP packet including the Packet Config. field which includes information indicating a request for a change in the frame aggregation of the packet. At the same time, the first node notes the time $t_0$ when this packet is sent. Upon receipt of this packet, the second node detects the request set out in the Packet Config. field, implements the requested structure in step 2100 by altering the frame aggregation and sends packets conforming to this structure back to the first node. The first node receives the packet in step 2200 and upon detection of the number of speech frames included in the new packet structure using the information contained in the table of contents field, determines the time elapsed since sending the packet at $t_0$. This time can then be used to determine the delay as described with reference to the first embodiment.

Figure 6:
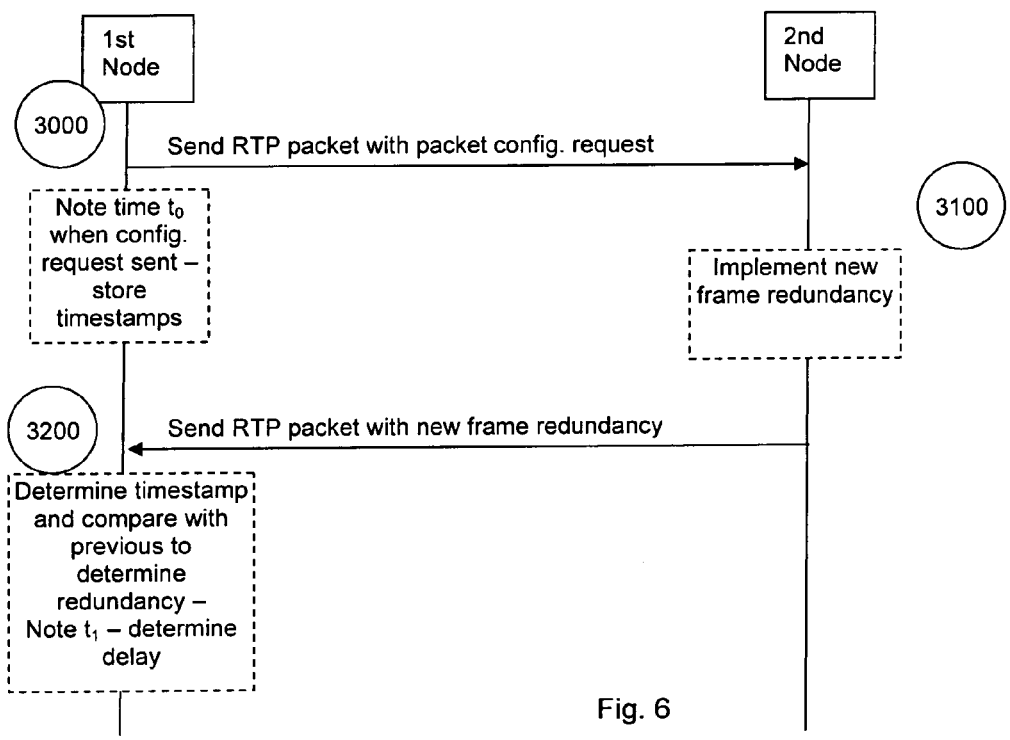
FIG. 6 shows the signalling between the nodes for determining a round trip delay in accordance with a third embodiment of the present invention.

FIG. 6 schematically illustrates the signalling and other steps involved in the measurement of delay using the Packet Config. field in a packet in accordance with the third embodiment of the present invention. At step 3000, the first node sends an RTP packet including the Packet Config. field which contains information indicating a request for a change in the redundancy level. At the same time, the first node notes the time $t_0$ when this packet is sent. Prior to this step, the first node 10 also stores speech frames or the timestamps of speech frames for comparison. Upon receipt of this packet, the second node detects the request set out in the Packet Config. field, implements the requested structure in step 3100 and sends packets conforming to this structure back to the first node. The first node receives a first packet in step 3200 and notes a second time $t_1$. The timestamp for each frame contained in this packet is then determined and compared with those for previously received packets. If the requested redundancy has been implemented, the time elapsed $t_1-t_0$ is determined and this time is used to determine the delay as described with reference to the first embodiment. Preferably, the configuration request concerns a change in the redundancy level only, not the offset redundancy. However, if the configuration request concerns offset redundancy, further received packets are monitored to determine whether the requested redundancy has been implemented.

It will be understood that the same considerations concerning the handling of packets by each node in order to obtain a reliable measurement on which to base the delay discussed in relation to the first embodiment will apply equally to these embodiments, although in both cases no reliable measurement can be achieved when the second node is operating in discontinuous transmission (DTX). Moreover, while the three embodiments have been described separately, it is entirely conceivable that a reconfiguration request sent by the first node 10 can consist of a combination of two or more of these embodiments. For example, the first node 10 could send a codec mode change request in combination with a redundancy level change request. If the second node responds to only one or any sub-set of these requests by changing the packet structure, possibly because restrictions are in place preventing the other modification, this can be deemed to be a valid response by the first node and used to determine delay.

Once a node has determined an end-to-end delay over a specific link, this may be used to modify the operation of various elements of the node, for example the jitter buffer or the encoder. In addition, this information may be transmitted to other elements in the network so enabling a more general network adaptation to multimedia delays.

Knowing the end-to-end delay of a particular link can be of great advantage to a communication service. For example, if the delay is known, this can be used to improve the perceived multimedia quality. For example if the determined end-to-end delay is short, the jitter buffer in a node can be operated in such a way as to reduce the number of late losses and increase the delay slightly. In this way, the multimedia quality can be improved while still maintaining conversational quality. A short determined delay also permits longer windows ("look-ahead") to be used by the multimedia encoder. This improves the coding efficiency and hence the multimedia quality. If, on the other hand, the delay is long, the jitter buffer could be operated to allow for an increased number of late losses, thereby improving conversational quality at the cost of multimedia quality. This is particularly effective if there is excessive jitter for a small fraction of the packets.

Knowledge of the delay also enables the optimisation of network resource usage. If the delay is short and the observed loss rate is low, the packetization may be modified to lower the transmitted bit rate and/or packet rate. This would lower the network load so freeing capacity for other users and services without impacting on the perceived quality.

A further advantage in knowing the end-to-end delay in a terminal where the client is executing, is that this enables optimisation of the resource usage, such as the battery or CPU. For example, if the end-to-end delay is short resources may be saved by using a less complex jitter buffer, which would introduce more delay. Battery life can then be lengthened or the processing power could alternatively be used for other applications. In addition, the network and radio transmission parts can be operated less frequently by grouping transmissions. For example packets could be transmitted two at a time in order to halve the transmission frequency.

The invention claimed is:

1. A method for determining a round-trip delay for sending multimedia data between a first network node and a second network node over a communications network, the multimedia data having a first multimedia data portion and a sequentially second multimedia data portion, wherein the multimedia data is encapsulated in data units, the method being implemented in the first network node and comprising:
   receiving the first multimedia data portion from a second node, the first multimedia data portion encoded by the second node using a first media encoding;
   sending an encoding request to the second node requesting the second node use a second media encoding, the second media encoding being different than the first media encoding;
   subsequently detecting an encoding response from the second node, the encoding response comprising the second multimedia data portion encoded using the second media encoding;
   measuring the time elapsed between sending the encoding request and detecting the encoding response; and
   determining a value for round-trip delay based on the measured time elapsed.

2. The method of claim 1, wherein the encoding request is sent in at least one data unit, and wherein the detecting an encoding response comprises detecting a data unit that is encoded according to the second media encoding.

3. The method of claim 2, wherein the sending an encoding request comprises sending the encoding request in-band as part of a data unit by including request information in at least one data field of the data unit.

4. The method of claim 2, wherein each data unit is a packet that encapsulates at least one frame of encoded multimedia data as packet payload.

5. The method of claim 1, wherein each data unit is a packet that encapsulates at least one frame of encoded multimedia data, and wherein the sending an encoding request comprises sending a request for changing the number of frames of encoded multimedia data included in a packet.

6. The method of claim 5, wherein the sending an encoding request includes sending a first packet to the second node that includes a first data field having first information indicative of the number of frames of encoded data included in a single packet.

7. The method of claim 6, wherein the detecting an encoding response from the second node includes receiving a second packet from the second node and detecting information in a second data field of the second packet that is indicative of the number of frames of encoded multimedia data included in the second packet.

8. The method of claim 6, wherein the detecting an encoding response from the second node includes receiving a second packet from the second node, detecting the length of the second packet, and determining the number of frames of encoded multimedia data contained in the second packet based on the length of the second packet.

9. The method of claim 1, wherein each data unit is a packet that encapsulates at least one encoded frame, and wherein the sending an encoding request comprises sending a request indicating a desired number of times for an encoded frame to be transmitted in different packets.

10. The method of claim 9, wherein the sending an encoding request includes setting first information in a data field forming part of a packet, the first information being indicative of a request to retransmit at least one frame of encoded multimedia data in at least one subsequent packet.

11. The method of claim 9 wherein the detecting an encoding response from the second node includes:
   determining the number of times at least one frame of encoded multimedia data is detected in different packets received from the second node; and
   if the number of times that the at least one frame of encoded multimedia data is detected corresponds to the desired number of times included in the request, determining the round-trip delay for transmission of multimedia data to and from the second node based on the measured time elapsed between sending the encoding request and the first receipt of the retransmitted frame.

12. The method of claim 1, wherein the communications network is a circuit-switched network.

13. The method of claim 1, wherein the communications network is a packet-switched network.

14. A first node of a communications system for exchanging multimedia data with at least a second node over a communications network, the multimedia data having a first multimedia data portion and a sequentially second multimedia data portion, the first node being configured to encode the multimedia data in data units prior to transmission to the at least one second node over the communications network, and to decode encoded multimedia data included in data units received from the second node over the communications network, the first node comprising a controller configured to:
control the generation and reception of the data units;
receive the first multimedia data portion from the second node, the first multimedia data portion encoded by the second node using a first media encoding;
send an encoding request to the second node requesting the second node use a second media encoding, the second media encoding being different than the first media encoding;
subsequently detect an encoding response from the second node, the encoding response comprising the second multimedia data portion encoded using the second media encoding;
measure the time elapsed between sending the encoding request and detecting the encoding response; and
determine a round-trip delay for transmission of multimedia data to and from the second node based on the measured time elapsed.

15. The first node of claim 14, wherein the controller is configured to:
send the encoding request to the second node in the at least one data unit; and
detect the encoding response by detecting a data unit subsequently received from the second node encoded according to the second media encoding.

16. The first node of claim 15, wherein the controller is further configured to send the encoding request in-band as part of a data unit by including request information in at least one data field of the data unit.

17. The first node of claim 14, wherein each data unit is a packet that encapsulates at least one frame of encoded multimedia data, and wherein the encoding request includes a request for changing the number of frames of encoded multimedia data included in a packet.

18. The first node of claim 17, wherein the controller is further configured to:
insert first information in a first data field of a first packet, the first information being indicative of a request for a specific number of frames of encoded multimedia data to be included in a single packet; and
send the first packet to the second node as the encoding request.

19. The first node of claim 18, wherein the controller is further configured to:
receive a second packet from the second node; and
detect second information in a second data field of the second packet, the second information being indicative of the number of frames of encoded multimedia data included in the second packet.

20. The first node of claim 14, wherein each data unit is a packet that encapsulates at least one encoded frame, and wherein the encoding request includes a request indicating a desired number of times for at least one frame of encoded data to be transmitted in different packets.

21. The first node of claim 20, wherein the controller is further configured to insert first information in a data field in a first packet, the first information being indicative of a request to retransmit at least one frame of encoded multimedia data in at least one separate packet.

22. The first node of claim 20, wherein the controller is further configured to:
determine subsequently for each frame received from the second node the number of times a frame is retransmitted; and
if the number of times that the each frame is retransmitted corresponds to the desired number of times included in the request, determine a value for round-trip delay for transmission of multimedia data to and from the second node based on the measured time elapsed between sending the encoding request and the first receipt of the retransmitted frame.

23. The first node of claim 14, wherein the communications network is a circuit-switched network.

24. The first node of claim 14, wherein the communications network is a packet-switched network and each data unit is a packet encapsulating at least one frame of encoded multimedia data.

* * * * *